3,184,300
COMPOSITION AND METHOD FOR PROMOTING GROWTH AND PROTECTING PLANTS FROM DAMAGE BY PARASITIC PATHOGENS
Alan J. Lemin, Richland, and Arnolds Steinhards and Gerald A. Boyack, Kalamazoo, Mich., assignors to The Upjohn Company, Kalamazoo, Mich., a corporation of Michigan
No Drawing. Filed Apr. 7, 1958, Ser. No. 726,621
13 Claims. (Cl. 71—2.6)

This invention relates to a method for promoting the growth of plants by stimulating the plants and/or by protecting plants from damage by parasitic plant pathogens such as fungi and bacteria, and to novel compositions of matter useful therein.

In accordance with the present invention it has been found that N-lower-alkanoylsulfanilic acid hydrazides, such as the N-formyl-, N-acetyl-, N-propionyl-, N-isobutyryl-, and N-butyrylsulfanilic acid hydrazides, are effective for stimulating the growth of plants and for the control of parastic pathogens that infect plants. These hydrazides have both systemic and topical action. Systemically they promote the growth of plants independently of whether the plants are infected or not. These compounds can be applied to foliage, roots, seeds, or other parts of the plant. The N-formyl- and N-acetylsulfanilic acid hydrazides are particularly effective for these several purposes. The other N-lower-alkanoylsulfanilic acid hydrazides have the same type of activity, but to a progressively lesser extent. Other N-acylsulfanilic acid hydrazides such as N-(chloroacetyl-sulfanilic acid hydrazide and N-benzoylsulfanilic acid hydrazide are without apparent activity.

The N-lower-alkanoylsulfanilic acid hydrazides are amphoteric nitrogen compounds which can exist in the form of salts with acids or bases. Both the free hydrazides and the salts are active. Suitable salts include the hydrochloride, sulfate, phosphate, nitrate, citrate, acetate, lactate, oxalate, succinate, and like acid addition salts; the sodium, potassium, ammonium, lithium, and like alkali metal salts; the calcium, strontium, barium, magnesium, and like alkaline earth metal salts; and the mercury, manganese, iron, copper, nickel, cobalt, chromium, lead, cadmium, zinc, aluminum and like heavy metal salts. Unless otherwise specified the term "hydrazide" is intended to include both the free hydrazide and the salt forms.

The free N-lower-alkanoylsulfonilic acid hydrazides can be prepared by reacting the corresponding N-lower-alkanoylanilide with chlorosulfonic acid and reacting the N-lower-alkanoylsulfanilyl chloride thus obtained with hydrazine. The acid addition salts and alkali metal salts are advantageously formed simply by neutralizing the free N-lower-alkanoylsulfanilic acid hydrazide with an appropriate acid or base, e.g., hydrochloric acid, sulfuric acid, phosphoric acid, nitric acid, citric acid, acetic acid, lactic acid, oxalic acid, succinic acid, sodium hydroxide, ammonium hydroxide, potassium hydroxide, lithium hydroxide, and the like. Generally speaking, it is preferred to form the alkaline earth metal salts and the heavy metal salts by metathesis, e.g., as illustrated by Examples 2 and 3 below wherein an alkali metal salt of an N-lower-alkanoylsulfanilic acid hydrazide is reacted with representative alkaline earth metal salts and heavy metal salts.

The following examples are illustrative of the preparation of compositions of the invention, but are not intended to be limiting. Example 1 illustrates the preparation of free N-lower-alkanoylsulfanilic acid hydrazides of the invention, as well as acid addition salts and alkali metal salts thereof.

EXAMPLE 1

*Preparation of N-formylsulfanilic acid hydrazide and salts thereof*

(A) N-FORMYLSULFANILYL CHLORIDE

To 37.59 grams of formanilide is added 86 grams of chlorosulfonic acid. Heat is evolved and after the initial reaction subsides, the resulting solution is heated on a steam bath under a reflux condenser for about two hours. The solution is cooled to about 25 degrees centigrade and slowly poured onto two liters of crushed ice, with stirring. After the mixture is warmed to about 25 degrees centigrade the resulting white solid is collected by filtration, washed three times with 500-milliliter portions of cold water, and air-dried on the filter. This product, N-formyl-sulfanilyl chloride, is used without further purification for the preparation of the hydrazide.

(B) N-FORMYLSULFANILIC ACID HYDRAZIDE

One milliliter of hydrazine is added to a suspension of 0.5 gram of N-formylsulfanilyl chloride in five milliliters of 95 percent ethanol, whereupon a vigorous reaction occurs. The reaction mixture is cooled and thiry milliliters of water is added. The solid product is recovered by filtration, washed successively with water and 95 percent ethanol, and dried. The N-formylsulfanilic acid hydrazide thus obtained has a melting point of 153–155 degrees centigrade (with decomposition).

*Analysis.*—Calcd. for $C_7H_9N_3O_3S$: C, 39.10; H, 4.18; N, 19.55; S, 14.89. Found: C, 39.40; H, 4.24; N, 19.64; S, 14.94.

(C) POTASSIUM SALT OF N-FORMYLSULFANILIC ACID HYDRAZIDE

A solution of 0.56 gram (0.01 mole) of potassium hydroxide in ten milliliters of water is added to a suspension of 2.15 grams (0.01 mole) of N-formylsulfanilic acid hydrazide in thirty milliliters of 95 percent ethanol. The reaction mixture is warmed to about 35 degrees centigrade until a clear solution is obtained. The solution is evaporated to dryness under reduced pressure at about 35 degrees centigrade, the potassium salt of N-formylsulfanilic acid hydrazide being thus obtained as a solid.

(D) N-FORMYLSULFANILIC ACID HYDRAZIDE HYDROCLORIDE

Concentrated hydrochloric acid (1.1 milliliters) is added to a suspension of 2.15 grams (0.01 mole) of N-formyl-sulfanilic acid hydrazide in ten milliliters of absolute ethanol. By evaporating the reaction mixture to dryness under reduced pressure, N-formysulfanilic acid hydrazide hydrochloride is obtained as a solid.

By following the procedure set forth in Example 1, but replacing formanilide with acetanilide, propionanilide, isobutyranilide, and butyranilide, respectively, free N-acetyl-, N-propionyl-, N-isobutyryl-, and N-butyryl-sulfanilic acid hydrazides and the potassium and the hydrochloride salts thereof are obtained.

By substituting other appropriate acids and bases, as given above, the corresponding salts are obtained, e.g., the sulfate, phosphate, nitrate, citrate, acetate, lactate, oxalate, succinate, sodium, ammonium, and lithium salts of N-formyl-, N-acetyl-, N-propionyl-, N-isobutyryl-, and N-butyrylsulfanilic acid hydrazides.

Example 2 illustrates the preparation of heavy metal salts of N-lower-alkanoylsulfanilic acid hydrazides of the invention.

EXAMPLE 2

*Preparation of heavy metal salts of N-acetylsulfanilic acid hydrazide*

(A) MANGANOUS SALT OF N-ACETYLSULFANILIC ACID HYDRAZIDE

Four grams (0.1 mole) of sodium hydroxide and 22.9 grams (0.1 mole) of N-acetylsulfanilic acid hydrazide are placed in a 250-milliliter flask, and 100 milliliters of water is added thereto. The mixture is heated for a few minutes on a steam-bath to provide a clear solution of the sodium salt of N-acetylsulfanilic acid hydrazide. This solution is filtered to remove a small amount of insoluble material.

A solution of 8.45 grams (0.05 mole) of manganous sulfate monohydrate in fifty milliliters of water is gradually added, with stirring, to the above aqueous solution of the sodium salt. This mixture containing the desired manganous salt as a precipitate is allowed to stand for five minutes and then is filtered. The filter cake is washed successively with methanol and ether, and is then dried in a vacuum oven at about 25 degrees centigrade. The manganous salt of N-acetylsulfanilic acid hydrazide thus obtained weighs 24.1 grams. It decomposes above 200 degrees centigrade, without melting. *Analysis.*—11.41 percent manganese found, 10.93 percent theoretical.

(B) ZINC SALT OF N-ACETYLSULFANILIC ACID HYDRAZIDE

Following the procedure of part A, but replacing manganous sulfate monohydrate with 6.8 grams (0.05 mole) of anhydrous zinc chloride, and adding two drops of concentrated hydrochloric acid to the aqueous solution of zinc chloride, 21.4 grams of white zinc salt of N-acetylsulfanilic acid hydrazide is obtained. It does not melt up to 300 degrees centigrade.

(C) COBALTOUS SALT OF N-ACETYLSULFANILIC ACID HYDRAZIDE

Following the procedure of part A, but replacing manganous sulfate monohydrate with 14.55 grams (0.05 mole) of cobaltous nitrate hexahydrate, 21.2 grams of the cobaltous salt of N-acetylsulfanilic acid hydrazide is obtained. It decomposes above 160 degrees centigrade, without melting.

(D) CUPRIC SALT OF N-ACETYLSULFANILIC ACID HYDRAZIDE

Following the procedure of part A, but replacing manganous sulfate monohydrate with 8.5 grams (0.05 mole) of cupric chloride dihydrate, the cupric salt of N-acetylsulfanilic acid hydrazide is obtained. It decomposes above 220 degrees centigrade, without melting.

(E) FERRIC SALT OF N-ACETYLSULFANILIC ACID HYDRAZIDE

Following the procedure of part A, but replacing manganous sulfate monohydrate with ferric chloride hexahydrate, the ferric salt of N-acetylsulfanilic acid hydrazide is obtained. It decomposes above 196 degrees centigrade, without melting.

(F) MERCURIC SALT OF N-ACETYLSULFANILIC ACID HYDRAZIDE

Following the procedure of part A, but replacing manganous sulfate monohydrate with 15.9 grams (0.05 mole) of mercuric acetate, the mercuric salt of N-acetylsulfanilic acid hydrazide is obtained.

(G) LEAD SALT OF N-ACETYLSULFANILIC ACID HYDRAZIDE

Following the procedure of part A, but replacing manganous sulfate monohydrate with 16.55 grams (0.05 mole) of lead nitrate, the lead salt of N-acetylsulfanilic acid hydrazide is obtained.

(H) NICKELOUS SALT OF N-ACETYLSULFANILIC ACID HYDRAZIDE

Following the procedure of part A, but replacing manganous sulfate monohydrate with 6.48 grams (0.05 mole) of anhydrous nickelous chloride, the nickelous salt of N-acetylsulfanilic acid hydrazide is obtained. It does not melt up to 300 degrees centigrade.

(I) CHROMIC SALT OF N-ACETYLSULFANILIC ACID HYDRAZIDE

Following the procedure of part A, but replacing manganous sulfate monohydrate with 23.9 grams (0.033 mole) of chromic sulfate octadecahydrate, the chromic salt of N-acetylsulfanilic acid hydrazide is obtained.

(J) CADMIUM SALT OF N-ACETYLSULFANILIC ACID HYDRAZIDE

Following the procedure of part A, but replacing manganous sulfate monohydrate with 9.26 grams (0.05 mole) of anhydrous cadmium chloride, the cadmium salt of N-acetylsulfanilic acid hydrazide is obtained. It decomposes above 250 degrees centigrade, without melting.

(K) ALUMINUM SALT OF N-ACETYLSULFANILIC ACID HYDRAZIDE

Following the procedure of part A, but replacing manganous sulfate monohydrate with 12.4 grams (0.033 mole) of aluminum nitrate monohydrate, the aluminum salt of N-acetylsulfanilic acid hydrazide is obtained.

By following the procedure set forth in Example 2, but replacing N-acetylsulfanilic acid hydrazide with N-formyl-, N-propionyl-, N-isobutyryl-, and N-butyrylsulfanilic acid hydrazides, respectively, the manganous, zinc, cobaltous, cupric, ferric, mercuric, lead, nickelous, chromic, cadmium, and aluminum salts thereof are obtained.

Example 3 illustrates the preparation of alkaline earth metal salts of N-lower-alkanoylsulfanilic acid hydrazides of the invention.

EXAMPLE 3

*Preparation of alkaline earth metal salts of N-acetylsulfanilic acid hydrazide*

(A) BARIUM SALT OF N-ACETYLSULFANILIC ACID HYDRAZIDE

A solution of four grams (0.1 mole) of sodium hydroxide in 100 milliliters of water is added to 24.0 grams (0.105 mole) of N-acetylsulfanilic acid hydrazide contained in a 250-milliliter flask. The mixture is heated for a few minutes on a steam-bath to provide a clear solution of the sodium salt of N-acetylsulfanilic acid hydrazide. This solution is filtered to remove a small amount of insoluble material.

A solution of 10.4 grams (0.05 mole) of anhydrous barium chloride in twenty milliliters of water is gradually added, with stirring, to the above aqueous solution of the sodium salt. Precipitation of the desired barium salt commences after about fifteen minutes. The mixture is allowed to stand for one hour more before it is filtered. The filter cake is washed with water, and is then dried in a vacuum oven at about 25 degrees centigrade. The barium salt of N-acetylsulfanilic acid hydrazide thus obtained decomposes above 240 degrees centigrade, without melting.

(B) CALCIUM SALT OF N-ACETYLSULFANILIC ACID HYDRAZIDE

Following the procedure of part A, but replacing anhydrous barium chloride with 8.2 grams (0.05 mole) of anhydrous calcium nitrate, the calcium salt of N-acetylsulfanilic acid hydrazide is obtained.

(C) STRONTIUM SALT OF N-ACETYLSULFANILIC ACID HYDRAZIDE

Following the procedure of part A, but replacing anhydrous barium chloride with 14.18 grams (0.05 mole) of strontium nitrate tetrahydrate, the strontium salt of N-acetylsulfanilic acid hydrazide is obtained.

(D) MAGNESIUM SALT OF N-ACETYLSULFANILIC ACID HYDRAZIDE

Following the procedure of part A, but replacing anhydrous barium chloride with 4.76 grams (0.05 mole) of anhydrous magnesium chloride, 15.5 grams of the magnesium salt of N-acetylsulfanilic acid hydrazide is obtained. It decomposes above 200 degrees centigrade, without melting. *Analysis.*—4.41 percent magnesium found, 5.00 percent theoretical.

By following the procedure set forth in Example 3, but replacing N-acetylsulfanilic acid hydrazide with N-formyl-, N-propionyl-, N-isobutyryl-, and N-butyrylsulfanilic acid hydrazides, respectively, the barium, calcium, strontium, and magnesium salts thereof are obtained.

The hydrazides need not be used in pure condition for the treatment of plants, since in the method and formulations of the invention the hydrazides are dispersed in a phytonomic carrier, that is to say, a carrier that can be applied to the plants without phytotoxicity or other adverse effects on the plants.

The active agents of the invention can be used alone or in combination with other fungicidal, virucidal, insecticidal, bactericidal, or acaricidal materials. Surfactants, and if desirable, other adjuvants such as stickers, can be present. Any of the conventional wetting and dispersing agents of the anionic, cationic, and nonionic types that are commonly employed in compositions for controlling infections of plants can be used. Suitable surfactants having sufficient wetting activity for the purposes of this invention include alkyl sulfates and sulfonates, alkylbenzenesulfonates, sulfosuccinate esters, polyoxyethylene sulfates, polyoxyethylene sorbitan monolaurate, alkylarylpolyether sulfates, alkylarylpolyether alcohols, alkylnaphthalenesulfonates, alkyl quaternary ammonium salts, sulfated fatty acid esters, sulfated fatty acid amides, glycerol mannitan laurate, polyalkylether condensates of fatty acids, and ligninsulfonates, the sulfates and sulfonates, of course, being used in the form of their soluble salts, e.g., sodium salts. All these surfactants are capable of reducing the surface tension of water to less than about forty dynes per centimeter in concentrations of about one percent or less. Suitable phytonomic carriers for the active agents of the invention include water containing such a surfactant, or an inert dusting powder such as talc, pyrophyllite, diatomite, clays such as bentonite, Georgia clay, Attapulgus clay, wood or walnut shell flour, and the like. Dusting powder is understood to be a solid material comminuted so that it has an average particle size less than fifty microns, advantageously less than fifteen microns. The carrier also can be a water-dispersible powder such as commonly is obtained by incorporating a surfactant in a dusting powder. All or part of the carrier can be a phytonomic oil, e.g., summer oil.

A suitable formulation is obtained by blending and milling 327 pounds of Georgia clay, 4.5 pounds of Triton X–100 (an alkylaryl polyether alcohol) as a wetting agent, 9 pounds of Daxad 27 (polymerized sodium salt of substituted benzoid long-chain sulfonic acid) as a dispersing agent, and 113 pounds of the active ingredient. The resulting formulation has the following percentage composition (parts herein are by weight unless otherwise specified).

|  | Percent |
|---|---|
| Active ingredient | 25 |
| Triton X–100 | 1 |
| Daxad 27 | 2 |
| Georgia clay | 72 |

This fomulation, when dispersed in water at one pound per 100 gallons, gives a spray formulation containing about 0.03 percent (300 parts per million) active ingredient.

Another suitable formulation is obtained by mixing approximately equal parts of the active ingredient and pyrophyllite, comminuting either before or after the admixture as desired, to produce a dusting powder, and dispersing the resulting product in an aqueous vehicle with the aid of a surfactant. Suitable surfactants include sodium lauryl sulfate, sodium and calcium ligno-sulfonates, 1-tetradecyl-4-methylpyridinium chloride, Triton X–100, and Pluronic F–68 (ethylene oxide-propylene glycol condensate, nonionic surfactant). If desired the surfactant can be incorporated in the dry mixture either by dry milling or by adding it in solution in a volatile solvent such as ethanol or acetone, mixing to form a paste, drying, and milling.

Another suitable formulation is obtained by dissolving the active material in a water-miscible solvent such as dimethylformamide or dimethyl sulfoxide. The concentration in such solutions can range from about 0.5 percent hydrazide, up to a saturated or near saturated solution. An illustrative formulation consists of ten parts of the hydrazide and ninety parts of dimethylformamide or other solvent. On adding such a solution and a surfactant, such as exemplified above, to water, aqueous suspensions and/or solutions of the active ingredient are obtained of a concentration according to the proportions used. If desired the surfactant can be included in the solution. A suitable preparation is obtained by dissolving one part of the hydrazide and one part of Triton X–100 in 98 parts of dimethylformamide.

The hydrazides of this invention are particularly effective for the control of rusts that infect cereal crops and other grasses, such as wheat, oats, barley, bluegrass, etc. For example, excellent control of wheat-rust, both protective and eradicative, has been obtained using concentrations of active ingredient ranging from 125 parts to 2,000 parts per million without damage to the plants. Higher or lower concentrations of active ingredient ranging from fifty to 5,000 parts per million can be used, however, depending upon the amount of active material applied per acre. Suitably the rate is adjusted to between about 0.125 and 25 pounds per acre, advantageously to between about 0.25 and 5 pounds per acre. Effective control has been obtained for both leaf-rust (*Puccinia rubigo-vera tritici*) and stem-rust (*Puccinia graminis tritici*).

Systemic effects have been noted, especially when using nonionic and cationic wetting agents, thus making possible application as a soil drench.

The hydrazides of the invention are effective against powdery mildew of cucumbers (*Erysiphe cichoacerarum*), the copper salts being preferred for this purpose, more particularly the cupric salts of N-formyl- and N-acetylsulfanilic acid hydrazides. The hydrazides of the invention also are active against early blight of tomatoes (*Alternaria solani*), and seed decay and seedling blight of wheat, caused by species of Fusaria and Pythia.

The hydrazides of the invention also effectively promote the growth of plants, for example, wheat and other grasses. Generally speaking, when the hydrazides are employed for plant stimulatory purposes, it is preferred to apply them to the plants in somewhat higher concentration and/or at somewhat greater rate than when they are used primarily for the control of parasitic plant pathogens. Thus for plant stimulatory purposes, it is preferred to employ the hydrazides at concentrations ranging from 250 to 10,000 parts per million, particularly from 500 to 4000 parts per million, and at rates ranging from 0.25 to fifty pounds per acre, particularly from 0.5 to ten pounds per acre.

Illustratively, when free N-acetylsulfanilic acid hydrazide was sprayed on ten-day old Little Club wheat seedlings at a concentration of 500 parts per million, the treated plants had a height of 24.25 centimeters two weeks after treatment, whereas the control plants (untreated plants) had a height of 20.85 centimeters. When the same active ingredient was dusted on Little Club wheat seed at the rate of two ounces per bushel of a five percent dusting powder, the seedlings grown from the treated seed had a height of 44.4 centimeters two months after planting, whereas the seedlings grown from untreated seed had a height of 28.6 centimeters.

It will of course be appreciated by plant husbandrymen that the conditions encountered when applying the method and compositions of this invention to actual practice can vary widely. Included among the variables that may be encountered are the particular purpose or purposes of plant treatment (i.e., plant stimulation and/or control of parasitic plant pathogens), the degree of infestation by pathogens, the particular plant being treated, the degree of development of the plant, the prevailing weather conditions such as temperature, relative humidity, rainfall, dews, etc. Hence it may at times be a matter of choice and judgment as to the very best means of application of the particular compound, under the prevailing conditions, and for the particular purpose under consideration.

A further aspect of the invention resides in the unexpected discovery that the activity toward plants, as disclosed hereinbefore, of the alkaline earth metal salts and heavy metal salts of the N-lower-alkanoylsulfanilic acid hydrazides can be enhanced by a simple expedient, namely, by metathetically forming such salts in situ in liquid formulations, particularly aqueous formulations, and more particularly aqueous formulations containing surfactant material. This is done conveniently and effectively merely by preparing a liquid formulation containing a desired concentration of a soluble salt of the hydrazide, advantageously an alkali metal salt, and mixing therewith an alkaline earth metal salt or a heavy metal salt (e.g., of the kind disclosed above, that is to say, manganous sulfate, ferric chloride, zinc chloride, cobaltous nitrate, cupric chloride, mercuric acetate, lead nitrate, nickelous chloride, chromic sulfate, cadmium chloride, aluminum nitrate, barium chloride, calcium nitrate, strontium nitrate, magnesium chloride, and the like). Ordinarily, stoichiometric amounts are used, although other proportions can be used if so desired. For example, suitable tank mixes are obtained using fifty to 200 percent of the stoichiometric proportions. For some purposes, such as for eradicative or protective control of wheat-rust, such tank-mix formulations containing salts formed in situ as described above, give superior control.

Suitable tank-mix formulations are obtained either by adding separately to the tank, desired quantities of the alkali metal salt of the N-lower-alkanoylsulfanilic acid hydrazide and a soluble salt of the heavy metal or alkaline earth metal, or by adding to the tank a prepared, dry-mix formulation containing both the alkali metal salt of the N-lower-alkanoylsulfanilic acid hydrazide and the soluble salt of the heavy metal or alkaline earth metal. Surfactants and other adjuvants can also be included in such dry mixes, so that a tank mix can be made up simply by adding a prepared, dry-mix formulation to a tank of water.

It is to be understood that the invention is not to be limited to the exact details of operation or materials shown and described, as obvious modifications and equivalents will be apparent to one skilled in the art, and the invention is therefore to be limited only by the scope of the appended claims.

We claim:

1. A method of promoting the growth of plants which comprises treating the plants with a plant growth promoting amount of a N-lower-alkanoyl-sulfanilic acid hydrazide having the formula

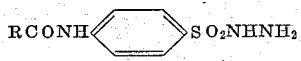

wherein R is selected from the group consisting of hydrogen and alkyl containing from 1 to 4 carbon atoms.

2. A method of promoting the growth of plants which comprises treating the plants with a plant growth promoting amount of N-acetylsulfanilic acid hydrazide.

3. A method of promoting the growth of plants which comprises treating the plants with a plant growth promoting amount of N-formylsulfanilic acid hydrazide.

4. A method of protecting plants from damage by parasitic pathogens which comprises treating the plants with a parasitic plant pathogen inhibiting amount of a N-lower-alkanoylsulfanilic acid hydrazide having the formula

wherein R is selected from the group consisting of hydrogen and alkyl containing from 1 to 4 carbon atoms.

5. A method of protecting plants from damage by parasitic pathogens which comprises treating the plants with a parasitic plant pathogen inhibiting amount of N-acetylsulfanilic acid hydrazide.

6. A method of protecting plants from damage by parasitic pathogens which comprises treating the plants with a parasitic plant pathogen inhibiting amount of N-formylsulfanilic acid hydrazide.

7. A method for inhibiting rust development on grass which comprises applying to said grass a rust-inhibiting quantity of an N-lower-alkanoylsulfanilic acid hydrazide having the formula

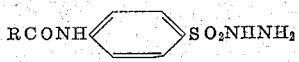

wherein R is selected from the group consisting of hydrogen and alkyl containing from 1 to 4 carbon atoms.

8. A method for inhibiting rust development on grass which comprises applying to said grass a rust-inhibiting quantity of N-acetylsulfanilic acid hydrazide.

9. A method for inhibiting rust development on grass which comprises applying to said grass a rust-inhibiting quantity of N-formylsulfanilic acid hydrazide.

10. N-Lower-alkanoylsulfanilic acid hydrazide salt of a heavy metal selected from the class consisting of mercury, manganese, iron, copper, nickel, cobalt, chromium, lead, cadmium, zinc and aluminum.

11. A dry composition suitable for addition to water to produce a tank-mix formulation, said dry composition comprising a parasitic plant pathogen inhibiting and plant growth promoting amount of an alkali metal salt of an N-lower-alkanoylsulfanilic acid hydrazide and a soluble salt of a heavy metal selected from the class consisting of mercury, manganese, iron, copper, nickel, cobalt, chromium, lead, cadmium, zinc and aluminum in substantially stoichiometric proportions.

12. A dry composition suitable for addition to water to produce a tank-mix formulation, said dry composition comprising a parasitic plant pathogen inhibiting and plant growth promoting amount of an alkali metal salt of an N-lower-alkanoylsulfanilic acid hydrazide and a soluble salt of an alkaline earth metal in substantially stoichiometric proportions.

13. A composition of matter suitable for promoting growth of plants and for protecting them from damage by parasitic pathogens which comprises a parasitic plant pathogen inhibiting and plant growth promoting amount of an N-lower-alkanoylsulfanilic acid hydrazide having the formula

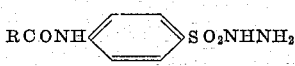

wherein R is selected from the group consisting of hydrogen and alkyl containing from 1 to 4 carbon atoms, inclusive, dispersed in a mixture of an inert pulverulent solid and a surfactant capable of reducing the surface tension of water to less than about 40 dynes per centimeter in concentrations of less than about 1 percent.

References Cited by the Examiner

FOREIGN PATENTS 901,650 1/54 Germany.
960,190 3/57 Germany.

(Other references on following page)

OTHER REFERENCES

Curtius in "Journal für praktische Chemie," December 1926, Bd. 112, pp. 117 to 137.

Lehmann in "Bull. Soc. Chim. Belg.," 55, pp. 52 to 96, (pages 55, 56, 64 and 69 particularly relied on), 1946.

Halliman et al. in "Chemical Abstracts," 1943, vol. 37, column 1396(7).

Niemiec in "Chemical Abstracts," 1948, vol. 42, col. 5436.

Jansen et al. in "Chemical Abstracts," 1953, vol. 47, columns 1633(h) to 1634(d).

Biniecke et al. in "Chemical Abstracts," 1955, vol. 49, column 8168(h).

JULIAN S. LEVITT, *Primary Examiner.*

M. A. BRINDISI, G. D. MITCHELL, *Examiners*